United States Patent [19]

Kenney et al.

[11] Patent Number: 5,437,929
[45] Date of Patent: Aug. 1, 1995

[54] GERMANIUM PHTHALOCYANINE FILMS

[75] Inventors: Malcom E. Kenney, Cleveland Heights; Terri R. Clark, Morristown, both of Ohio

[73] Assignee: Edison Polymer Innovation Corp., Brecksville, Ohio

[21] Appl. No.: 183,527

[22] Filed: Jan. 19, 1994

[51] Int. Cl.$^6$ ............................................. B32B 33/00
[52] U.S. Cl. ............................. 428/411.1; 427/430.1; 427/434.3; 427/419.5; 540/122; 540/128; 540/139
[58] Field of Search ............................ 428/411.1, 910; 427/430.1, 434.3, 419.5; 118/402; 540/122, 128, 139

[56] References Cited

U.S. PATENT DOCUMENTS 4,900,817  2/1990  Batzel et al. ..................... 540/128
5,280,183  1/1994  Batzel et al. ..................... 257/40

OTHER PUBLICATIONS

"Phthalocyanine Langmiur—Blodgett Film Microsensors for Halogen Gases", H. Y. Wang, Wen H. Ko, D. A. Batzel, M. E. Kenney, and J. B. Lando, *Sensors and Actuators*, B1 (1990), pp. 138–141, Elsevier Sequoia: The Netherlands.

*Primary Examiner*—Paul J. Thibodeau
*Assistant Examiner*—David Abraham
*Attorney, Agent, or Firm*—Hudak & Shunk Co.

[57] ABSTRACT

A process for preparing film structures comprising phthalocyanine oligomers having metal coordinating atoms in adjacent rings connected along a central axis through oxygen atoms. The ligands on the outermost rings of the structures are hydrophilic. The preferred coordinating atom is germanium and the structures may be prepared on a Langmuir-Blodgett balance using phthalocyanine oligomers in which one of the outermost rings is connected to a hydrophobic ligand while the other outermost ring is connected to a hydrophilic ligand. The pH of the subphase in the trough of the balance is maintained at a pH of from about 2 to 6, and the hydrophobic ligand is converted to a hydrophilic ligand during the process of coating a substrate by passing it upward through the film on the subphase.

9 Claims, 2 Drawing Sheets

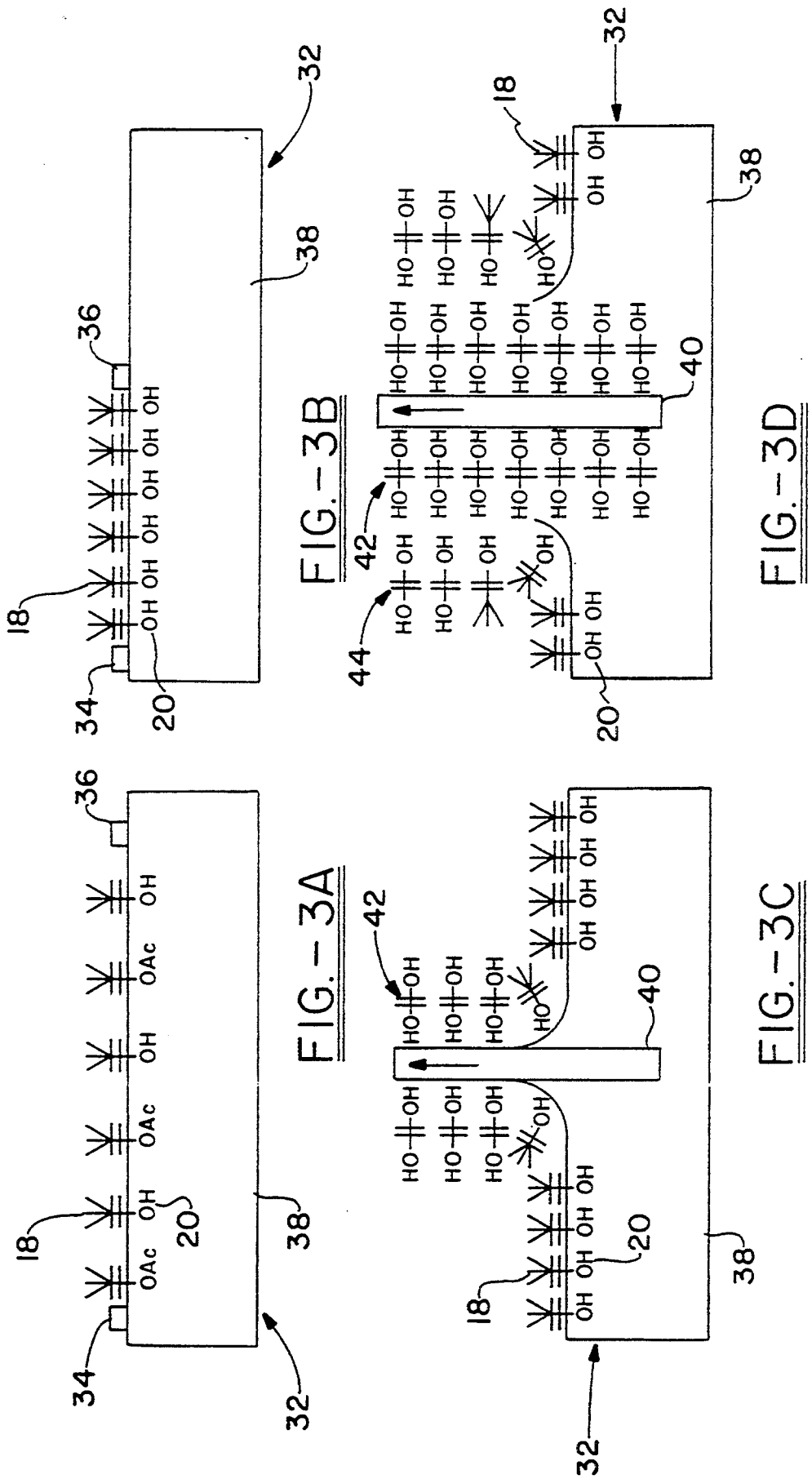

5,437,929

GERMANIUM PHTHALOCYANINE FILMS

TECHNICAL FIELD

This invention relates to films made from amphiphilic phthalocyanine compounds. More particularly, this invention relates to phthalocyanine films whose anisotropic properties are intensified due to the absence of bulky axial ligands appended to the phthalocyanine molecules composing them. Specifically, this invention relates to phthalocyanine compounds having labile axial groups, which in the film-forming process disclosed, are cleaved by hydrolysis, thereby yielding films useful in the fabrication of electronic devices, including those modulated by laser, magnetic or electrical field energy.

BACKGROUND OF THE INVENTION

In the past, semi-conducting films have been employed in the manufacture of electronic devices whose conductivity is modulated by the nature of the chemical substances present in the ambient environment in which the devices are located. By way of example, and typically, a small voltage is applied to electrodes of these devices, resulting in the generation of a current whose magnitude depends upon the conductivity of the film employed in their fabrication. The conductivity of the film, in turn, depends upon the nature of the chemicals which are in contact with it. Consequently, the change in conductivity provides a method by which the presence and amount of chemical substances in the device's environment can readily be determined.

In the past, however, such films have been subject to degradation, and a further problem has been the limited conductivity of the films. Both these characteristics have curtailed the sensitivity of the devices, making it difficult to measure accurately the electrical differences due to the presence of environmental chemical substances.

A notable improvement in the electrical sensitivities of such devices was made possible by the use of the films taught in U.S. Pat. No. 4,900,817, which employs, for example, amphiphilic oligomers formed from phthalocyanine rings, the coordinating atoms of which are coupled through oxygen linkages to provide a plurality of parallel rings. The coordinating atoms of each of the outermost rings of such oligomers are coupled, respectively, to a hydrophilic ligand and to a hydrophobic ligand, and a solution of the oligomers is formed into the desired film by deposition of it on an aqueous subphase of a Langmuir-Blodgett balance where the hydrophilic ligand moves into association with the subphase, while the hydrophobic ligand is repelled by the subphase. Such combined effects effectively align the rings parallel to the surface of the subphase.

After evaporation of the solvent and the subsequent compression of the oligomer molecules on the subphase, a substrate can be coated with multiple layers of the film formed by the compressed molecules simply by passing the substrate repeatedly through the film, for instance in a vertical direction. During each pass, the film orients itself relative to the substrate so that the surfaces having like characteristics are in association with each other, e.g., hydrophobic ligand to hydrophobic ligand, and hydrophilic ligand to hydrophilic ligand.

While the films described are useful for the purposes mentioned, they have inherent characteristics which make them relatively unsuitable for certain uses including some of those contemplated with the films taught herein.

For example, and with reference to the hydrophobic ligands responsible for assisting in the proper orientation of the phthalocyanine rings parallel to the subphase of the balance, the required hydrophobicity is made possible through the presence of relatively long aliphatic chains. When the hydrophobic axial ligands of the oligomer molecules pair together as described during formation of adjacent film layers, these chains form regions of hydrocarbon appendages that impede electron transfer. This tends to make the use of such films inappropriate for some of the newer electronic devices that depend upon anisotropic properties for their proper functioning.

An example of such a device comprises a Langmuir-Blodgett structure fabricated from a plurality of amphiphilic phthalocyanine layers, L storages incorporated in a laminate structure formed between top and bottom electrodes, at least one of which is semi-transparent. Interspersed between the phthalocyanine layers are, for example, conjugated molecule layers, L gate layers composed of a different phthalocyanine which in their unmodulated state provide a substantial barrier to the interlayer transfer of electrons. When, however, an electric field or light, for instance, laser light, is applied in a plane perpendicular to the plane of the laminate, the L gate layers become conducting, permitting electrons stored in the L storage layers to pass through the L gate layers. This allows the devices to be modulated by an electric field, or by light to control the retrieval of information in the form of the electrons passed from layer-to-layer.

For such modulation to be practical, however, it is desirable that the phthalocyanine films employed be essentially devoid of regions that serve as neither storage nor gate regions such as regions of aliphatic chains previously referred to, since these would interfere with proper operation of the devices.

In view of the preceding, therefore, it is a first aspect of this invention to provide film structures comprising a plurality of parallel phthalocyanine layers in which the phthalocyanine rings of adjacent layers carry only hydroxo axial ligands.

A second aspect of this invention is to provide a process for hydrolyzing phthalocyanine films to convert the hydrophilic and hydrophobic ligands to hydroxo groups.

Another aspect of this invention is to provide phthalocyanine films useful in the fabrication of electronic devices modulated by electrical fields, or by light energy.

An additional aspect of this invention is to provide anisotropic phthalocyanine film structures.

A further aspect of this invention is to eliminate the hydrophobic axial ligands in phthalocyanine films through hydrolysis carried out during the coating of a substrate on a Langmuir-Blodgett balance.

Yet another aspect of this invention is to coat substrates on a Langmuir-Blodgett balance with a plurality of phthalocyanine film layers in which the phthalocyanine rings carry only hydroxo axial ligands.

Still a further aspect of this invention is to provide a substrate coated with phthalocyanine film layers that can be modulated with light or by electrical or magnetic fields to provide electronic devices.

BRIEF DESCRIPTION OF THE INVENTION

The preceding and additional aspects of the invention are provided by a process for preparing a substrate coated with a film comprising:

preparing a solvent solution of an amphiphilic, multi-ring compound containing at least two adjacent, parallel phthalocyanine rings having identical coordinating atoms selected from the group consisting of germanium and tin located at the center of the rings. The rings are interconnected along an axis perpendicular to their ring surface and passing through the center thereof, by means of an oxygen atom located along the axis, the oxygen atom connecting the coordinating atoms in adjacent rings. The outermost ring at one end of the structure has a hydrophilic ligand attached to the coordinating atom thereof, while the outermost ring at the other end of the structure's axis has a hydrophobic ligand attached to the coordinating atom thereof. The solution is spread on an aqueous subphase having a pH of from about 2 to 6 and the solvent is evaporated, thereby providing an expanded monolayer of the compound on the subphase. The expanded monoloayer is compressed to form a substantially continuous film, and a substrate having a hydrophilic surface is thereafter passed substantially vertically through the film a desired number of times, thereby producing a coating on the substrate with each round trip.

The preceding and additional aspects of the invention are provided by a film having at least two layers, each such layer of the film comprising at least two adjacent, parallel phthalocyanine rings having identical coordinating atoms selected from the group consisting of germanium and tin located at the center of the rings. The rings are interconnected along an axis perpendicular to their surface which passes through the center thereof, by means of an oxygen atom connecting the coordinating atoms in adjacent rings. The outermost rings at both ends of the axis of each of the layers has a hydroxo ligand attached to the coordinating atoms thereof.

The preceding and still further aspects of the invention are provided by a process for preparing a substrate coated with the Langmuir-Blodgett film comprising preparing a solvent solution of an amphiphilic, multi-ring compound containing two adjacent, parallel phthalocyanine rings having germanium coordinating atoms. The rings are interconnected along an axis perpendicular to the ring surface which passes through the center thereof, by means of an oxygen atom located along the axis. The oxygen atom connects the coordinating atoms and adjacent rings, and the outermost ring at a first end of the axis has a ligand attached thereto selected from the group consisting of $-SiR_3$, where R may be the same or different, and each R has a minimum of about 6 carbon atoms and may contain oxygen, nitrogen or sulfur atoms; $OC_6X_4R'$, where X is H or an alkyl group that has up to 5 carbon atoms and may contain oxygen, sulfur or nitrogen atoms, and R' has at least about 10 carbon atoms and may contain oxygen, nitrogen or sulfur atoms; and OR'', where R'' has at least about 10 carbon atoms and may contain oxygen, nitrogen or sulfur atoms.

The solution described is spread on an aqueous subphase contained in a Langmuir-Blodgett balance, the subphase having a pH of from about 3 to 4. The solvent is subsequently evaporated from the solution to provide an expanded monolayer of the compound on the subphase which is thereafter compressed to form a substantially continuous film. Subsequently, a substrate having a hydrophilic surface is passed through the film to produce a coated substrate.

BRIEF DESCRIPTION OF THE DRAWINGS

The invention will be better understood when reference is had to the following Figures in which like-numbers refer to like-parts, and in which:

FIG. 3A is a schematic representation of a phthalocyanine oligomer deposited on the aqueous subphase of a Langmuir-Blodgett balance following evaporation of the solvent.

FIG. 3B is a schematic representation of a phthalocyanine oligomeric film on the balance of FIG. 3A, following compression of the film.

FIG. 3C is a schematic representation of a substrate in a Langmuir-Blodgett balance receiving an initial layer of a hydrolyzed phthalocyanine oligomeric film thereon.

FIG. 3D is a schematic representation of the substrate of FIG. 3C, receiving a second coating of the hydrolyzed phthalocyanine oligomeric film.

DETAILED DESCRIPTION OF THE INVENTION

Figure 1:
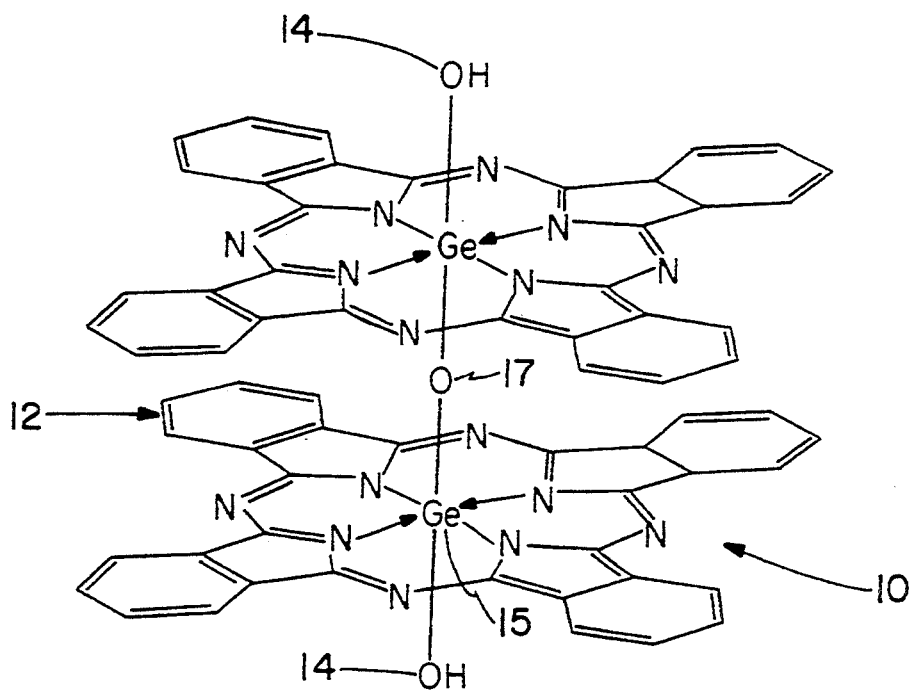
FIG. 1 is a diagrammatic representation of a phthalocyanine oligomer of the invention.

Phthalocyanines are characterized by a number of valuable characteristics. Such characteristics arise in large part because the ring is a planar, aromatic ring system. Such characteristics include the chemical, thermal and photochemical stability of such compounds, as well as their strong visible absorptions, high optical anisotropy, bivalency, in addition to other desirable properties. When the rings are stacked in a face-to-face manner and are fractionally oxidized, i.e., doped, they also include high and anisotropic electrical conductivity. The conductivity results in part from the generation of holes by the doping which can move in both the planar direction and the columnar or stacking direction.

As is well-known, Langmuir-Blodgett multi-layers or stacks can readily be formed by dissolving amphiphilic molecules in a volatile organic solvent. A small amount of the solution is spread on the surface of water, the subphase, in a Langmuir-Blodgett trough and the solvent is allowed to evaporate. The resulting expanded monolayer is then compressed by a motor-driven barrier to form a compressed monolayer in which the molecules are packed closely together. During the spreading-compression process, the molecules orient themselves so that their hydrophilic axial head groups or ligands are oriented toward the water in the trough, and their hydrophobic ligands are oriented in the opposite direction. Such a monolayer is transferred to a substrate by repeatedly immersing and withdrawing it from the monolayer-covered water, each cycle resulting in the formation of one or two additional layers on the substrate.

While compounds such as $(n-C_6H_{13})_3SiOSiPcOGePcOH$ are suitable for manufacturing phthalocyanine films, they suffer from the fact that their siloxy ligands remain attached to the ring throughout the film-forming process, leading to multilayers containing alternating regions of rings and siloxy groups, the latter having aliphatic chains appended thereto. Unfortunately, and as previously stated, the siloxy groups with their appended aliphatic chains form regions between the layers that are difficult for electrons to penetrate, thus leading to conductivity in the direction perpendicular to the film plane that is low and cannot be modulated. The invention disclosed provides a method to prepare closer face-to-face arrangements of the rings by hydrolyzing the bulky siloxy groups prior to forming the film laminate structures.

The closer face-to-face arrangement of the rings is accomplished according to the invention by providing phthalocyanine oligomers whose coordinating atoms are chosen so that the bond formed by them with the organosiloxy ligand is relatively labile, thereby facilitating its cleavage. With respect to providing a labile siloxy ligand, it has been found that when the coordinating metal is selected from among the heavier atoms, the bonding to the associated silicon atom is more subject to cleavage.

Where an acetoxy ligand is utilized as the amphiphilic axial group, the ligand is hydrolyzed during spreading of the phthalocyanine solution on the subphase, and before transfer of the monolayer to a solid substrate. The siloxy unit on the other hand, is hydrolyzed following formation of the compressed monolayer, that is, during the vertical transfer of the monolayer to the substrate.

While the mechanism of hydrolysis of the siloxy groups is not entirely clear, it is postulated that the siloxy groups are cleaved by hydrolysis resulting from acidic subphase water draining across the surface of the monolayer during the deposition process.

FIG. 1 shows a phthalocyanine oligomer of the invention following its hydrolysis as described. The oligomer 10 shown comprises a dimer formed from phthalocyanine rings 12 having hydroxo ligands 14 attached to the germanium coordinating atoms 15 of the outermost rings, the rings being connected through an oxygen atom 17 attached to their coordinating atoms along an axis passing through the center of the rings. While the Figure illustrates a dimer oligomer, the oligomers of the invention are not confined to dimers but may include more than two such connected phthalocyanine rings, for example, from 2 to about 4 rings, although oligomers having 2 rings constitute a preferred embodiment of the invention.

As indicated, the function of the ligands is to orient the phthalocyanine rings on the subphase so that the rings are aligned parallel to the surface of the aqueous subphase. In this regard, the hydrophilic ligands preferentially associate themselves with the polar surface of the subphase, while the hydrophobic ligands orient themselves as far as possible from the subphase. This tendency results in an orientation of the oligomers such that the axis passing through their center is substantially at right angles to the subphase surface.

With respect to the nature of the hydrophobic ligand, any of a number of groups may be employed, for example, a siloxy group of the general formula $-OSiR_3$ where the R may be the same or different and will contain a minimum of about 6 carbon atoms and may contain oxygen, nitrogen or sulfur atoms; $OC_6X_4R'$, where X is H or an alkyl group that has up to 5 carbon atoms and may contain oxygen, sulfur or nitrogen atoms, and R' has at least about 10 carbon atoms and may contain oxygen, nitrogen or sulfur atoms; and OR", where R" has at least about 10 carbon atoms and may contain oxygen, nitrogen or sulfur atoms.

In regard to the hydrophilic ligand, it may comprise chloroacetoxy, dichloroacetoxy, or trichloroacetoxy. Other halogen acetoxy ligands may also be employed. For instance, fluoro, bromo and iodo acid oxy ligands are useful for the purposes of the invention, including fluoroacetoxy, difluoroacetoxy, trifluoroacetoxy, bromoacetoxy, tribromoacetoxy, iodoacetoxy, diiodoacetoxy, and triodoacetoxy. A preferred embodiment of the invention, however, comprises dichloroacetoxy, trichloroacetoxy, fluoroacetoxy, dibromoacetoxy or tribromoacetoxy ligands. The hydrophilic ligand may also consist of a hydroxo group, in which case hydrolysis of the ligand is unnecessary.

As previously indicated, to facilitate cleavage of the bond between the coordinating atom to which the hydrophobic ligand is attached, the invention employs a relatively heavy metal atom so that as required the metal-oxygen-silicon linkage is easily cleaved (hydrolyzed). It has been found in this connection that phthalocyanine oligomers in which the coordinating atoms consist of germanium constitute a preferred embodiment of the invention, although phthalocyanine oligomers in which tin is the coordinating metal may also be useful.

Inasmuch as the hydrolyzed phthalocyanine compounds of the invention are rendered hydrophilic through the hydrolysis described, it is necessary that the substrates have a hydrophilic surface. Any of a number of substrates such as glass, silicon, germanium, aluminum, mica and others may be employed, providing they are properly treated to yield a hydrophilic surface. Glass substrates, for instance, may be sonicated in trichloroethylene, $CH_3OH$ and distilled water before being soaked in a saturated $KOH-C_2H_5OH$ solution, rinsed with pure water and dried. Substrates containing germanium or silicon, for instance, can be rinsed with methanol, air dried and cleaned in an argon plasma generator.

Figure 2:
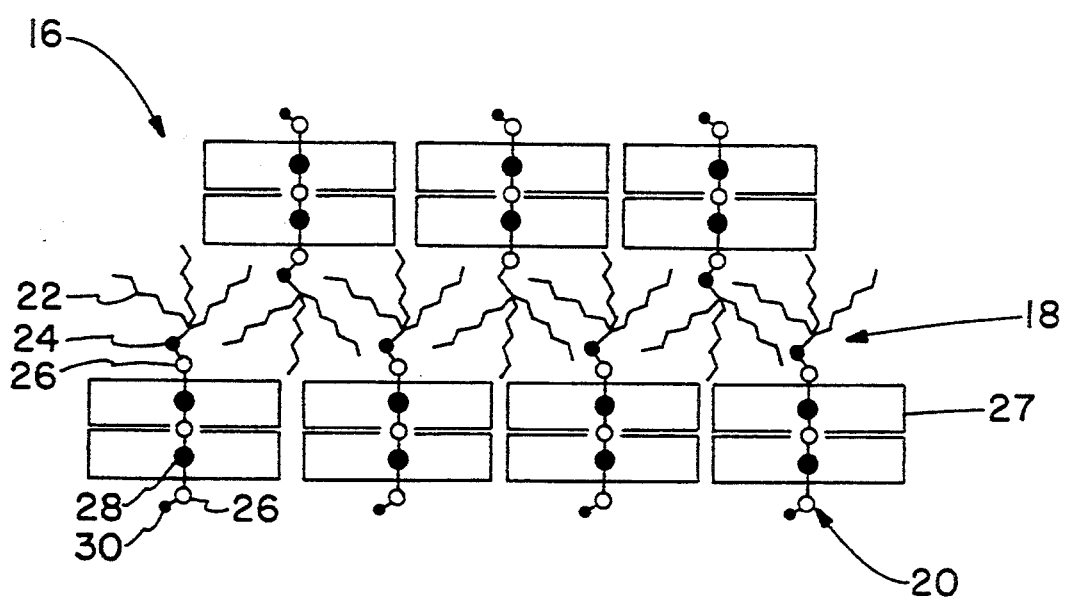
FIG. 2 is a schematic representation of adjoining layers of a phthalocyanine film of the prior art.

FIG. 2 is a schematic representation of adjoining layers of film prepared from a $(n-C_6H_{13})_3SiOSiPcOGePcOH$ oligomer of the prior art. The phthalocyanine rings 27 are joined by coordinating metal atoms 28 connected to oxygen atoms 26. It will be noted that the hydrophobic triorganosiloxy ligands 18 of the multilayer structure, generally 16, combine in the structure to form regions which include entangled hydrocarbon chains 22 and silicon and oxygen atoms 24 and 26, respectively. Attached to the other side of the film layers are the hydrophilic, hydroxo ligands 20 comprising oxygen atoms 26 and hydrogen atoms 30. The Figure clearly illustrates the impediment which the region 18 would present to electrons attempting to pass therethrough.

FIG. 3A is a schematic representation of a phthalocyanine oligomeric solution deposited on the aqueous subphase of a Langmuir-Blodgett balance. As shown, the balance, generally 32, comprises a trough filled with water 38. At one end of the trough is positioned a stationary barrier 34, while at the other end is positioned a movable barrier 36. During the film-forming process, a solvent solution of the film-forming phthalocyanine compound is deposited on the water subphase 38, the phthalocyanine oligomeric compounds automatically orienting themselves so that the hydrophilic portion 20 is located adjacent to, and associated with the surface of the subphase, while the hydrophobic triorganosiloxy ligand of the molecule 18 is in an upright position. Desirably, enough area is provided between the barriers so that each phthalocyanine molecule is provided with a spreading area of from at least about 1.7 nm² to about 5 nm², more preferably from about 2.5 nm² to 3.5 nm². Provision of the aforementioned area allows the individual molecules to arrange themselves without undesirable overlapping. As shown in the Figure, the acetoxy ligands are gradually hydrolyzed through contact with the aqueous phase, some being shown in the hydrolyzed hydroxo form, while others are still illustrated as acetoxy ligands.

FIG. 3B is a schematic representation of a phthalocyanine oligomeric film on the balance of FIG. 3A, following compression of the film. As shown, the stationary barrier 34 has remained in position, while the movable barrier 36 has been repositioned to force the phthalocyanine molecules into a compact film, floating on the surface of the aqueous phase 38. As shown in the Figure, the balance 32 maintains the molecular orientation of the phthalocyanine oligomer molecules in which the hydrophobic triorganosiloxy ligands 18 face away from the subphase 38, while the hydrophilic hydroxo ligands —OH face toward it and are associated therewith. The compression step shown in the Figure is deferred until the solvent in which the phthalocyanine oligomer has been dissolved has evaporated. As will be seen, at the time of the compression, the hydrophilic ligands probably have all been hydrolyzed to the hydroxo form.

Solvent evaporation normally is complete in from about 5 to 15 minutes, at which time the monolayer can be compressed, desirably at a speed of from about 15 to 60 cm²/min., more preferably at a speed of from about 15-25 cm²/min. While faster or slower speeds are possible, those mentioned provide sufficient time for the phthalocyanine rings to orient themselves in an interdigitated relationship so that a substantially hole-free film can be obtained. In order to avoid buckling of the film, it is preferable to apply a maximum pressure of from about 15 to 25 mN/meter to the film during compression, more preferably 18-23 mN/meter.

FIG. 3C is a schematic representation of a substrate in a Langmuir-Blodgett balance in the process of receiving an initial layer of the hydrolyzed phthalocyanine oligomeric film thereon. In the Figure illustrated, a substrate 40 has previously been passed downward into the Langmuir-Blodgett balance 32 and is in the process of being moved upwardly in a vertical direction therefrom. Since, as previously explained, the substrate has a hydrophilic surface, during the passage downward into the subphase 38, the substrate surface encounters the hydrophobic ligands 18, which being repelled by the hydrophilic surface, do not adhere thereto. On the upward movement, however, illustrated, the substrate surface is necessarily exposed to the hydrophilic hydroxo ligands which are attracted to its surface, adhering thereto. As movement of the substrate in an upward direction from the subphase is continued, and as previously mentioned, it is thought that the acidic water of the subphase, which has a controlled pH as explained more fully in the following, drains back into the Langmuir-Blodgett trough, contacting the hydrophobic ligands 18 in the process. It is believed that this contact of the acidified subphase draining over the exposed hydrophobic ligands breaks the silicon-oxygen-germanium linkage, substituting the hydrophilic hydroxo ligand for the hydrophobic ligand.

FIG. 3D is a schematic representation of the substrate of FIG. 3C receiving a second coating of a hydrolyzed phthalocyanine oligomeric film. As shown in the Figure, following coating of the substrate and hydrolysis of the hydrophobic groups as described in connection with FIG. 3C, the substrate has again been introduced into the Langmuir-Blodgett balance 32. However, as in the case of FIG. 3C, since the exposed surface of the coated substrate is hydrophilic, no coating is acquired during the passage downward in the balance due to the fact that the hydrophilic ligands are incompatible with the hydrophobic ligands exposed on the surface of the phthalocyanine film floating on the subphase 38. On the upward movement of the substrate 40 coated with the first film layer 42, however, the hydrophilic hydroxo groups of the first film layer are exposed to the hydrophilic ligands of the underside of the film floating on the surface of the balance 32 thus causing adherence of the hydrophilic groups to each other and the creation of a second layer 44 on the substrate.

In connection with the immersions described with reference to FIGS. 3C and 3D, the down trip speeds may be varied from about 30 to 70 mm/min., more preferably from about 45 to 55 mm/min. and the up trip speeds may be varied from about 0.5 to 10 mm/min., more preferably about 0.5 to 5 mm/min. In addition, in preparing multilayer films, it is desirable that the transferred monolayer be thoroughly dried before transfer of the subsequent layer. Typically, drying times of between about 10 to 50 minutes are sufficient for this purpose.

As previously described, the films of the invention depend upon the cleavage of the triorganosiloxy ligands from the outermost phthalocyanine rings. In this connection, it has been found that when the films are prepared on a Langmuir-Blodgett balance whose subphase has a pH of from about 2 to 6, more preferably from about 3 to 4, hydrolysis of the hydrophobic ligands occurs readily. In addition, a pH in the range described also probably facilitates hydrolysis of the acetoxy hydrophilic ligands. The subphase pH is conveniently controlled, for example, by the addition of a salt, a buffer, or a mineral acid. Desirably, however, an acid is used for the purpose, preferably hydrochloric acid.

Any volatile, water immiscible, solvent capable of dissolving the phthalocyanine oligomer will serve the purpose of the process of the invention; however, it is desirable that the spreading solvent evaporate rapidly and in this connection, a solvent such as dichloromethane is particularly preferred. However, chloroform and other solvents also provide satisfactory results. Irrespective of whichever solvent is selected, it is necessary that it be as dry and acid free as possible so that it does not cause decomposition of the compound to be spread.

Although not intended to be limiting in nature, the following examples are illustrative of the invention.

While other syntheses may be employed to synthesize the compounds of the invention, the following sequence of steps provides a satisfactory synthesis:

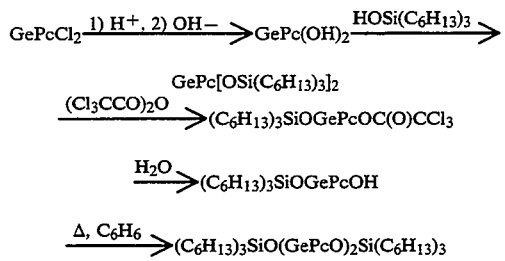

-continued

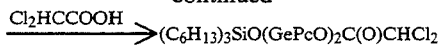

EXAMPLE 1

The preparation of GePc(OH)$_2$ is reported by Ralph D. Joyner and Malcolm E. Kenney in the *Journal of the American Chemical Society*, 82, 5790–5791 (1960). The preparation is also reported in the compound claimed in U.S. Pat. No. 3,094,535, the teaching of both of which references are incorporated herein by reference.

Preparation of GePc[n-OSi(C$_6$H$_{13}$)$_3$]$_2$

A mixture of GePc(OH)$_2$, 45.7 g, 0.0739 mol; (n-C$_6$H$_{13}$)$_3$SiOH, 80 mL, 0.21 mol, and toluene, 4.0 L, is refluxed in an apparatus equipped with a Dean-Stark trap for 3 hours. The reaction product is filtered hot and the residue washed with toluene. After being combined, the filtrate and washings are concentrated with a rotary evaporator maintained at 70° C. and 60 torr. The resultant oil is diluted with CH$_3$OH, and the suspension formed is filtered. The solid obtained is thereafter washed with CH$_3$OH and dried at 66° C. and 60 torr to yield 42.7 g, 49 percent of product. The compound is identified by infra-red spectroscopy and is seen to be turquoise in color; it is soluble in pentane, toluene, tetrahydrofuran, and dichloromethane.

Preparation of (C$_6$H$_{13}$)$_3$SiOGePcOC(O)CCl$_3$

A solution of GePc[OSi(n-C$_6$H$_{13}$)$_3$]$_2$, 41.6 g, 0.0351 mol, and N$_2$-purged toluene, 1.7 L, is azeotropically dried, yielding 360 mL of distillate, and is then equilibrated at 55° C. in an oil bath for 15 minutes under dry nitrogen. Trichloroacetic anhydride, 3.5 mL, 0.109 mol, is added to the solution, which is stirred at 55° C. for 8.5 days and filtered. The filtrate is evaporated to dryness with a rotary evaporator maintained at 50° C. and 60 torr, and the solid remaining is washed extremely rapidly with CH$_3$OH and dry pentane, after which it is air dried and weighed, producing a yield of 30.7 g, 84 percent. The compound, which is blue-green and soluble in toluene and dichloromethane, is identified by infrared spectroscopy.

Preparation of (n-C$_6$H$_{13}$)$_3$SiOGePcOH

A solution of (n-C$_6$H$_{13}$)$_3$SiOGePcOC(O)CCl$_3$, 37.9 g, 0.0362 mol; water, 1.3 mL, 0.072 mol; pyrrolidine, 6.0 mL, 0.072 mol, and toluene 1 L, is stirred for 10 minutes at a temperature of about 1° C. It is then evaporated to dryness in about 3 hours with a rotary evaporator maintained at approximately 5° C. and 3 torr. After being washed with pentane, 0.6 L; an ethanol-water solution, 2:1 ratio, 0.05 L; and pentane, 0.2 L, the solid is dried and suspended in pentane, 1 L. The suspension is stirred for 10 minutes, sonicated for 1 minute and then filtered. The solid is washed with pentane, 0.3 L, dried at 60° C., 60 torr, and weighed to yield 27.5 g, 87 percent.

A solution of this product, 0.193 g, and dichloromethane, 43 mL, is diluted with pentane, 200 mL, and chilled to about 0° C. for 30 minutes. The resulting suspension is filtered and the resulting solid rapidly washed with pentane, 5 mL; CH$_3$OH, two 1 ml portions, being used; and dry pentane, two 5 mL portions, before being air dried to yield 0.124 g, 64 percent of product. The compound, which is identified by infrared spectroscopy, is blue, and is soluble in toluene and dichloromethane.

Preparation of (n-C$_6$H$_{13}$)$_3$SiO(GePcO)$_2$Si(C$_6$H$_{13}$)$_3$

A suspension of (n-C$_6$H$_{13}$)$_3$SiOGePcOH, 26.5 g, 0.0294 mol; 4 Å Linde Molecular Sieves, 53.4 g, and dry benzene, 0.85 L, is refluxed in an apparatus equipped with a Dean-Stark trap for 9.5 hours. Subsequently, (n-C$_6$H$_{13}$)$_3$SiOH, 5.5 mL, approx. 0.015 mol, is added to the suspension, which is refluxed for an additional 15 minutes before being diluted benzene, 0.75 L, reheated to reflux and filtered. The solid is washed with benzene and the washings and filtrate are combined. The combined washings and filtrate are then evaporated to form an oil with a rotary evaporator maintained at 85° C. and 60 torr. Approximately 30.9 g of oil is produced which is shown by NMR spectroscopy to contain monomer, dimer, trimer and tetramer in the ratio of 4.2:5.7:0.7:0.3, and (n-C$_6$H$_{13}$)$_3$SiOH.

The material is subsequently purified by recrystallization in the following procedure. A solution of the monomer, dimer, trimer and tetramer mixture, 26.5 g, and heptane, 822 mL, is dried azeotropically under nitrogen to produce 67 mL of distillate. The dried mixture is refluxed for 10 minutes and then filtered hot, following which it is allowed to stand for 1 hour before again being filtered. The solid is washed with CH$_3$OH, air dried and weighed to produce 7.48 g of monomer, dimer, trimer and tetramer, the ratio being 5:92:2:3. A solution of this solid, (n-C$_6$H$_{13}$)$_3$SiOH, 157 μL, approximately 0.42 mmol, and dry heptane, 300 ML, is refluxed for 10 minutes, filtered hot and allowed to stand for 1 hour. It is then chilled to 0° C. for an hour and filtered again. The solid is washed with CH$_3$OH, air dried and weighed. The yield is 5.87 g, 27 percent of product based on the initial (n-C$_6$H$_{13}$)$_3$SiOGePcOH present.

Additional material can be isolated from the oligomer mixture in the filtrates by recrystallization, e.g., 5.13 g, 24 percent.

The recrystallization procedure gives a high purity product which is used to prepare the phthalocyanine compound of the invention, (C$_6$H$_{13}$)$_3$SiO(GePcO)$_2$-C(O)CHCl$_2$.

Preparation of (C$_6$H$_{13}$)$_3$Si(GePcO)$_2$C(O)CHCl$_2$

Under an atmosphere of nitrogen, a solution of CHCl$_2$COOH, 28 μL, 0.34 mmol, and dry toluene, 10 mL, is slowly added, i.e., at a rate of about 0.35 mL/minute to a solution of (n-C$_6$H$_{13}$)$_3$SiO(GePcO)$_2$Si(n-C$_6$H$_{13}$)$_3$, 0.603 g, 0.338 mmol, and dry toluene, 15 mL. The resulting solution is stirred for 1 ¼ hours at 18° C. and evaporated to dryness with a rotary evaporator maintained at 5° C. and 4 torr. The solid is rapidly washed with dry pentane, ten 25 mL portions; CH$_3$OH, two 10 mL portions, and dry pentane, two 50 mL portions, before being air dried for ¾ hour. The procedure provides 0.378 g, 69 percent of product which is identified by infrared spectroscopy.

The compound contains a small amount of (n-C$_6$H$_{13}$)$_3$SiOH. It is blue-green, and is soluble in toluene, tetrahydrofuran, 1-bromobutane and dichloromethane.

EXAMPLE 2

Preparation of (n-C$_6$H$_{13}$)$_3$SiO[GePcO]$_2$H

Under nitrogen, (n-C$_6$H$_{13}$)$_3$SiO(GePcO)$_2$-C(O)CHCl$_2$, 0.341 g, 0.0211 mmol, which has been ground and dried at 68° C. and 60 torr, is extracted with dry diethyl amine for about 3.3 hours. The solid remaining is washed with a 2:1 mixture of C$_2$H$_5$OH-H$_2$O, four 5 mL portions; C$_2$H$_5$OH, two 5 mL portions, and pentane, five 5 mL portions. Under protection from light, the solid is then stirred with HCl-free CHCl$_3$ for 10 minutes and filtered. Also with protection from light, the filtrate is evaporated to dryness with a rotary evaporator and the residue is washed with pentane and ether until the washings are clear. The material is then air dried and weighed to give 0.0689 g, 21 percent of product. The crude product is green-blue and soluble in toluene, tetrahydrofuran and dichloromethane.

EXAMPLE 3

Preparation of $(n-C_6H_{13})_3SiO(GePcO)_4Si(n-C_6H_{13})_3$

A solution of $(n-C_6H_{13})_3SiO(GePcO)_2H$, 0.0055 g, 0.0037 mmol, and benzene, 2.5 mL, is partially distilled to provide 1.5 mL of distillate over a 10 minute period and then evaporated to dryness with a rotary evaporator maintained at 45° C. and 60 torr. The solid is shown by NMR spectroscopy to consist of the bissiloxy and hydroxysiloxy dimers and the bissiloxy tetramer in a ratio of 8:2.

EXAMPLE 4

A modified continuous compression film balance, a Model P, MGW Lauda, is used to coat a substrate in the following manner. The balance has a trough, which measures $0.6 \times 15 \times 70$ cm, is coated with Teflon, and has stationary and moving barriers also made of Teflon. The moving barrier is connected to a position potentiometer, and the floating, stationary barrier is connected to a linear variable differential pressure transducer.

The balance is fitted with a custom-built device for dipping substrates, the key components of which are a microstepper motor having a speed of 7.5 nm per step, a reduction gear, as well as a rack and pinion.

The balance and dipper are controlled by an IBM computer, and the balance is supported on a vibration isolation table. The temperature of the balance is adjusted by a circulating water bath to about 20° C. Prior to its operation, the trough is cleaned with dichloromethane, rinsed with purified water, and filled with an HCl acidified water subphase. The pH of the subphase is measured with a pH meter and found to have a value of approximately 4.

Subsequently, a glass microscope slide substrate is sonicated in trichloroethylene, $CH_3OH$, distilled water, and then in purified water, after which it is soaked in a saturated $KOH-C_2H_5OH$ solution for one hour, finally being thoroughly rinsed with distilled water, purified water, and oven dried.

Approximately 10 to 15 mg of $(C_6H_{13})_3SiO(GePcO)_2C(O)CHCl_2$ is next mixed with approximately 25 mL of dichloromethane and the weight of the resulting solution is determined. This solution is thereafter deposited at a number of well separated locations on the subphase and the deposits are allowed to stand for approximately 10 minutes to permit the solvent to evaporate. The monolayer-subphase system is then compressed at a rate of about 23 cm²/min. until a pressure of approximately 20 mN/meter is achieved and maintained.

The substrate is thereafter mounted on the dipping device with its long axis perpendicular to the subphase surface, and lowered through the monolayer at a rate of approximately 50 mm/min. Following such immersion, it is withdrawn to its original position at a rate of about 2 mm/min., being held in a position outside the trough for 10 minutes to dry. The procedure results in a substrate which is uniformly coated with the oligomeric phthalocyanine film having hydroxo ligands on both its outer and inner sides, relative to the substrate surfaces. Subsequent dipping cycles provide additional layers of a hydroxo-sided film each time the substrate passes upward through the phthalocyanine film floating on the subphase.

In a subsequent experiment, in which, however, the trough of the balance is provided with a buffered subphase having a pH of about 8, the process fails to achieve a satisfactory film.

The above procedures result in the preparation of ring-only, multilayer films in which the rings are substantially parallel to the substrate surfaces on which they are coated. The films prepared are characterized by being mechanically, thermally, hydrolytically, and chemically robust and substantially free from pinholes. As such, the films are ideally suited for fabricating molecular scale electronics and optical electronics in which simple multilayers are active components.

Among the devices with which the films of the invention are useful may be mentioned molecular scale switches and other devices suitable for use in computers. Further devices could include photochromic devices, photovoltaic cells, electroluminescent diodes, field-effect transitors, optical sensors, electrical sensors, membranes, surface acoustic wave devices, metal-insulator-semiconductor diodes, integrated optics, and nonlinear optics such as wave guides and second harmonic generation, modulation phase retardation, parametric amphilification, optical bistability and high speed optical gating devices.

While in accordance with the patent status, a preferred embodiment and best mode has been presented, the scope of the invention is not limited thereto, but rather is measured by the scope of the attached claims.

What is claimed is:

1. A process for preparing a substrate coated with a film comprising:

preparing a solvent solution of an amphiphilic, multi-ring compound containing at least two adjacent, parallel phthalocyanine rings having identical coordinating atoms selected from the group consisting of germanium and tin located at the center of the rings, said rings being interconnected along an axis perpendicular to their surfaces and passing through the centers thereof, by means of single oxygen atoms located along said axis, said oxygen atoms connecting the coordinating atoms in adjacent rings and in which the outermost ring at one end of said axis has a hydrophilic ligand selected from the group consisting of chloroacetoxy, dichloroacetoxy, trichloroacetoxy, fluoroacetoxy, difluoroacetoxy, trifluoroacetoxy, bromoacetoxy, dibromoacetoxy, tribromoacetoxy, iodoacetoxy, diodoacetoxy, and triodoacetoxy, attached to the coordinating atom thereof, while the outermost ring at the other end of said axis has a hydrophobic ligand attached to the coordinating atom thereof;

depositing said solution on an aqueous subphase, said subphase having a pH of from about 2 to 6, thereby hydrolyzing said hydrophilic ligands to hydroxyl ligands;

evaporating said solvent from said solution to provide a monolayer of said compound on said subphase;

compressing said monolayer to form a substantially continuous film, and passing a substrate having a hydrophilic surface substantially vertically through said film, thereby hydrolyzing said hydrophobic ligand to a hydroxyl ligand and producing said coated substrate.

2. A process according to claim 1, in which said coordinating atoms are germanium.

3. A process according to claim 2, in which said hydrophobic ligand is a member selected from the group consisting of —OSiR$_3$ where R has at least about 6 carbon atoms and may be the same or different and may contain oxygen, nitrogen or sulfur atoms; OC$_6$X$_4$R', where X is H or an alkyl group with up to 5 carbon atoms and may contain oxygen, sulfur or nitrogen atoms, and R' has at least about 10 carbon atoms and may contain oxygen, nitrogen or sulfur atoms; and OR", where R", has at least about 10 carbon atoms and may contain oxygen, nitrogen or sulfur atoms.

4. A process according to claim 3, in which said hydrophilic ligand is hydroxo.

5. A process according to claim 4, in which said hydrophobic ligand is —OSiR$_3$ and said hydrophilic ligand is a member selected from dichloroacetoxy, trichloroacetoxy, dibromoacetoxy, tribromoacetoxy and fluoroacetoxy.

6. A process according to claim 1, in which said compound contains two said adjacent parallel phthalocyanine rings.

7. A process according to claim 1, in which said solvent is dichloromethane.

8. A coated substrate comprising
   a) a substrate and,
   b) a film of a multi-ring compound deposited on the substrate, the film havng at least two layers, each layer of said film comprising at least two adjacent, parallel phthalocyanine rings having identical coordinating atoms selected from the group consisting of germanium and tin located at the center of the rings, said rings being interconnected along an axis perpendicular to their surface and passing through the center thereof by means of an oxygen atom connecting the coordinating atoms in adjacent rings, and in which the outermost rings at both ends of said axis of each of said layers have a hydroxo ligand attached to the coordinating atoms thereof.

9. A process for preparing a substrate coated with a Langmuir-Blodgett film comprising:
   preparing a solvent solution of an amphiphilic multi-ring compound containing two adjacent, parallel phthalocyanine rings having germanium coordinating atoms, said rings being interconnected along an axis perpendicular to their ring surfaces and passing through the centers thereof by means of single oxygen atoms located along said axis, said oxygen atoms connecting the coordinating atoms in adjacent rings and in which the outermost ring at a first end of said axis has a ligand member selected from the group consisting of —OSiR$_3$ where R has at least about 6 carbon atoms and may be the same or different and may contain oxygen, nitrogen or sulfur atoms; OC$_6$X$_4$R', where X is H or an alkyl group with up to 5 carbon atoms and may contain oxygen, sulfur or nitrogen atoms, and R' has at least about 10 carbon atoms and may contain oxygen, nitrogen or sulfur atoms; and OR", where R" has at least about 10 carbon atoms and may contain oxygen, nitrogen or sulfur atoms, and wherein the outermost ring at a second end of said axis is a hydrophilic halogen acetoxy ligand selected from the group consisting of chloroacetoxy, dichloroacetoxy, trichloroacetoxy, fluoroacetoxy, difluoroacetoxy, trifluoroacetoxy, bromoacetoxy, dibromoacetoxy, tribromoacetoxy, iodoacetoxy, diodoacetoxy, and triodoacetoxy,
   depositing said solution on an aqueous subphase contained in a Langmuir-Blodgett balance, said subphase having a pH of from about 3 to 4;
   evaporating said solvent from said solution to provide an expanded monolayer of said compound on said subphase;
   compressing said expanded monolayer to form a substantially continuous film, and
   passing a substrate having a hydrophilic surface upwardly through said film, thereby producing said coated substrate.

* * * * *